Figure 1:
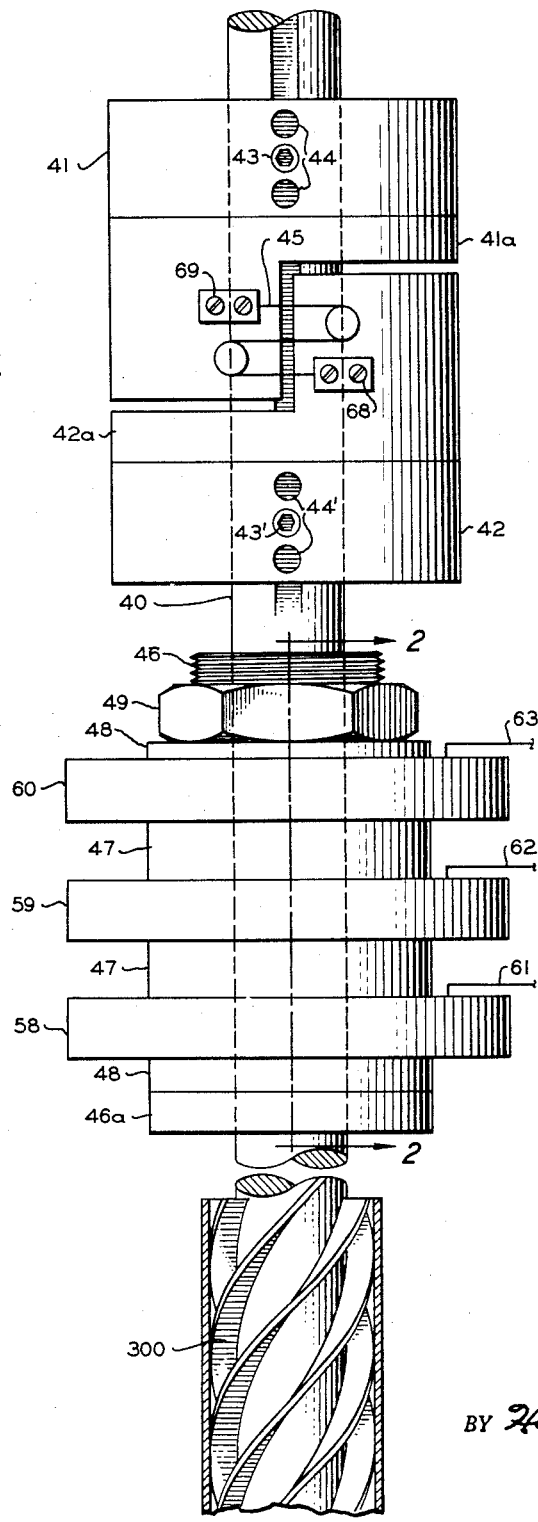

Feb. 17, 1959    H. N. CLAUDY    2,873,584
CONTACTOR AND TORQUE CONTROL DEVICE
Filed Dec. 2, 1954    3 Sheets-Sheet 1

INVENTOR.
H. N. CLAUDY
BY Hudson & Young
ATTORNEYS

Feb. 17, 1959     H. N. CLAUDY     2,873,584
CONTACTOR AND TORQUE CONTROL DEVICE
Filed Dec. 2, 1954     3 Sheets-Sheet 2
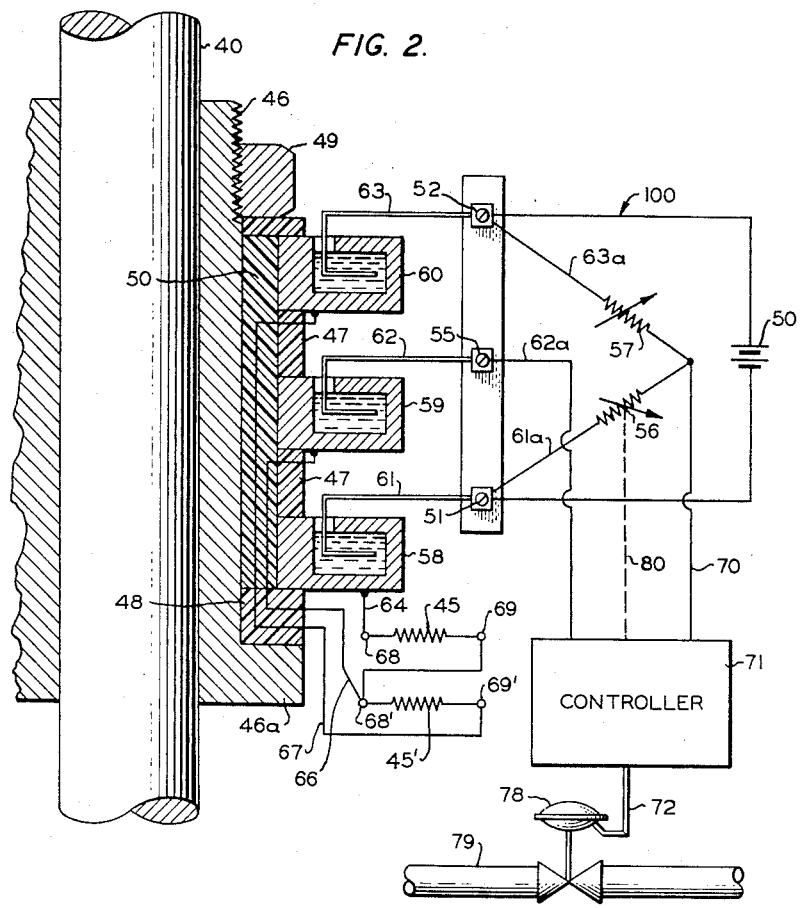
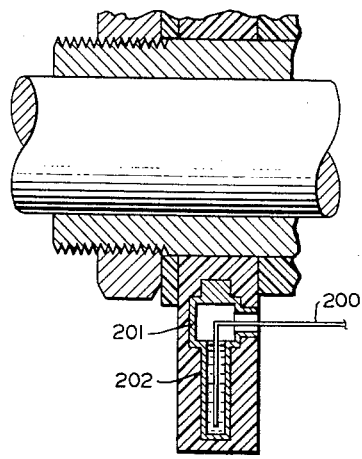
INVENTOR.
H. N. CLAUDY
BY
ATTORNEYS

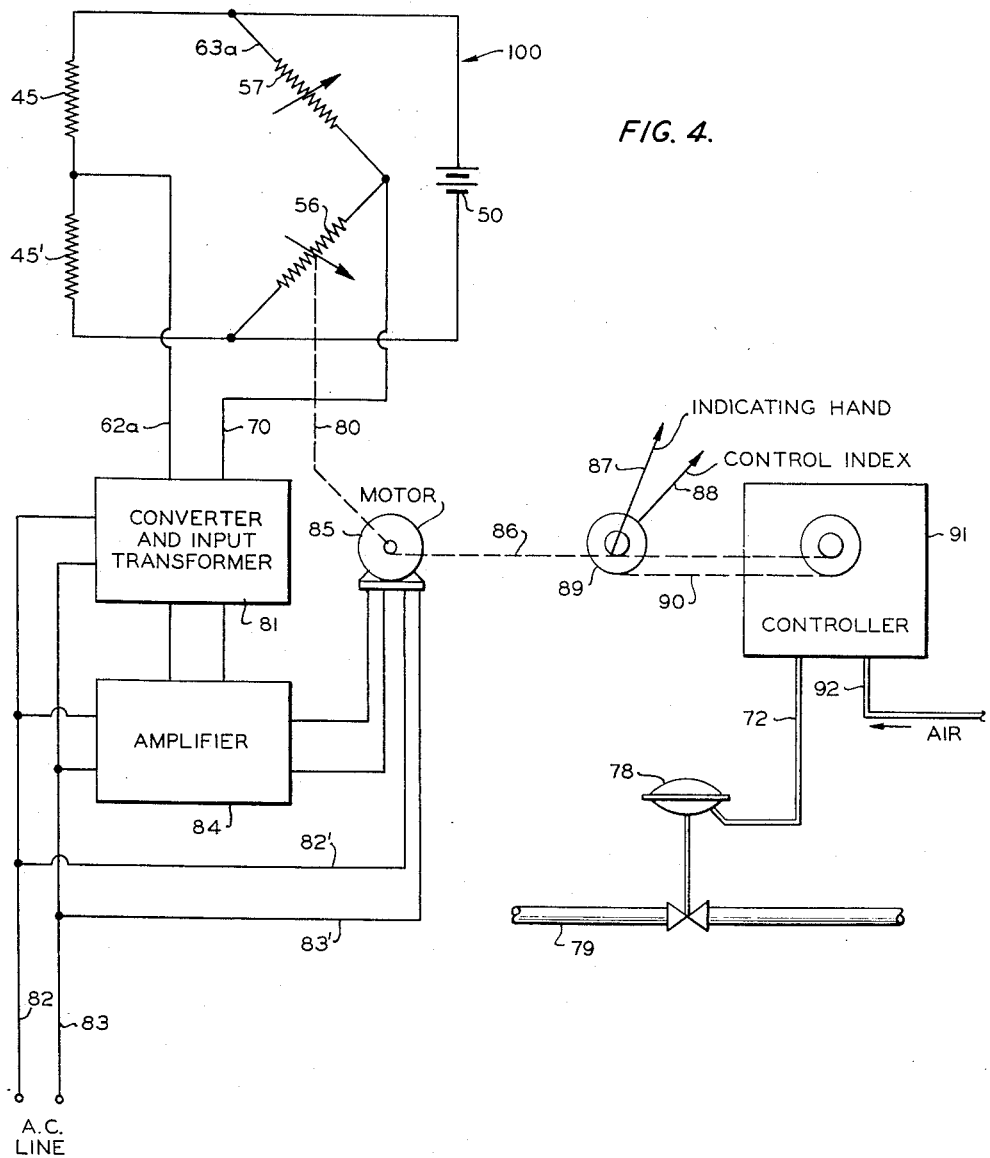

United States Patent Office 2,873,584
Patented Feb. 17, 1959

2,873,584

CONTACTOR AND TORQUE CONTROL DEVICE

Harry N. Claudy, Bartlesville, Okla., assignor to Phillips Petroleum Company, a corporation of Delaware Application December 2, 1954, Serial No. 472,577

12 Claims. (Cl. 62—135)

This invention relates generally to apparatus for continuously measuring and controlling the torsional stress on a rotating shaft. In another embodiment it relates to a means and method of controlling processes in which a liquid or slurry is stirred and/or transported by a rotating shaft such as an impeller or a screw conveyor, and wherein by measuring changes in the resistance to movement of the liquid or slurry its density and/or viscosity can be determined and controlled.

The use of strain gages applied to the shaft is a conventional method for measurement of torque in a rotating shaft. The angle of twist of the shaft produced by torsion forces is a linear function of the applied torque. This angle of twist may be transformed by suitable means into a linear motion, and it is the function of the strain gage to measure this linear motion. A strain gage is essentially a filament of alloy (for instance, copper-nickel). This filament changes in electrical resistance in proportion to the elongation to which it is subjected, and the change in electrical resistance is measured by a suitable means which may be a Wheatstone bridge circuit in combination with an indicating, recording and/or controlling instrument. The strain gage or gages are connected into an external Wheatstone bridge circuit, generally through slip rings on the shaft which contact a non-rotating brush assembly through which voltage is supplied to the gages from the bridge circuit. In this way the effect of torsional stress on the shaft is to cause a change of resistance of the strain gages which results in a proportional bridge unbalance. The relation between the torsional stress and bridge unbalance is exactly linear. This unbalance is then detected and employed to actuate a suitable indicating, recording and/or control device.

Various modifications have heretofore been proposed or used with such strain gages but such prior devices have been deficient in certain of their physical and functional aspects, such as for instance the use of slip rings for transmitting electrical responses from the rotating member to external indicating apparatus. One difficulty encountered with the general type of slip ring apparatus, as pointed out in U. S. 2,423,620, is that the slip rings and brushes inherently have a variable contact resistance which is usually sufficiently erratic compared to the relatively small change of impedance measured as to present a serious problem in determining the amount of the impedance change, particularly if a high degree of accuracy is desired and especially when the strain sensitive means is of a relatively low impedance type.

An object of this invention is to provide an improved contacting means for transmitting electrical responses from a strain-sensitive electrical impedance means mounted on a rotating shaft to an indicating and/or control means separate from the shaft.

A further object is to provide an improved apparatus to accurately transmit a change of impedance from a strain gage mounted on a rotatable member to an indicating and/or control apparatus supported independently thereof, said impedance change being an indication of changes in torque on the rotatable member.

Another object of this invention is to provide an improved method of measuring the viscosity and/or density of a liquid or slurry through the torque applied to the shaft of a helical screw rotating in said fluid.

A more specific object is a method of controlling the rate of crystallization in a para-xylene fractionator through changes in the density of the magma as indicated by the apparatus of this invention.

The present invention overcomes the difficulty of accurately transmitting strain gage impedance changes to the external portion of the circuit, especially the problem of slip ring resistance. A strain-sensitive electrical impedance means comprising two mating torque rings and two unbonded strain gages is so mounted on a rotating shaft that a change in the impedance of the electrical circuit is produced in response to torsional deflections on the shaft. Such torsional forces are caused by changes in the density and/or viscosity of the liquid or slurry in which the shaft operates. The change in voltage drop across the impedance means is transmitted to the external portion of the circuit by means of annular contactors mounted on the shaft, suitably insulated, and containing sufficient mercury to make connection with stationary contact points. From these points the electrical signal is relayed to a measuring device, preferably a Wheatstone bridge. The resulting unbalance of the bridge circuit produces a signal which is fed to a control unit. This acts to restore the bridge circuit to balance and to open or close a valve or effect other means to change the viscosity and/or density of the fluid in the direction required to restore the viscosity and/or density to the desired values.

The invention will be described by reference to the accompanying drawings which illustrate a preferred embodiment of the apparatus of the present invention. Figure 1 is a plan view of the torque measuring device positioned on the shaft. Figure 2 is an assembly view partially in section of my novel apparatus mounted on the shaft for transmitting the impedance changes from the strain gages to an external control device. Figure 3 illustrates one version of a mercury contactor for a horizontal shaft. Figure 4 illustrates schematically a typical indicating and control device for use in the system.

Referring now particularly to Figure 1, there is illustrated the assembly of the torque measuring device on the shaft 40. Two mating parts or torque rings 41, 42 to which insulating segments 41a, 42a are rigidly attached as an integral extension thereof are affixed to the shaft 40 by set screws 43, 43'. These and other set screws not shown, but which are preferably two in number for each mating part or torque ring, form the apexes of equilateral triangles lying in planes perpendicular to the axis of the shaft. In this way mechanical contact with the shaft 40 is limited to two planes, one plane perpendicular to the axis of the shaft for each of the supports. Since these two planes are a fixed and predetermined distance apart this determines the length of the shaft whose angle of rotation is to be measured. Additional holes 44, 44' and other holes not shown but correspondingly placed for the other set screws described are provided so that the length of the shaft being measured can be varied according to the anticipated torque on the shaft. When different ranges of viscosity and/or density are to be measured, the length of shaft being measured can be changed easily as by loosening and removing set screw 43 and its corresponding set screws in torque ring 41 and inserting in hole 44 and the two other holes lying on the same plane perpendicular to the axis of the shaft. Naturally the distance between the planes of support must be greater when the shaft encounters slight resistance to rotation; with higher resistance to rotation the distance between the planes of support may be shortened accordingly. The wire elements of unbonded strain gage 45 are suitably mounted on the insulating segments 41a, 42a under initial tension and span the intervening gap. Strain gage 45 is one of two separate strain gages, the other, 45' (Figure 2), being mounted diametrically opposite 45. The ends of the strain gage are secured to screw-in elements 68, 69. In addition to this single pair of unbonded strain gages, other pairs of strain gages may be similarly mounted diametrically opposite each other at equally spaced locations around the circumference of the torque rings.

Shaft 40 may connect at one end to a helical screw 300 as indicated or to any other shaft-mounted element, as, for example, an agitator. Sleeve 46, rigidly mounted on shaft 40, is partly encased in ceramic tube 50 (Figure 2) which carries three annular rings or contactors 58, 59, 60; these are separated from each other by insulating discs 47 and enclosed at each end by insulating rings 48. The insulating materials may be Bakelite, Teflon, or other such plastic material. Sleeve 46 is flanged at one end 46a to provide a backing for the annular contactors and insulating rings, and at the other end is threaded to receive nut 49. These features are shown in greater detail in Figure 2.

Figure 2 illustrates the apparatus for completing the connection of the strain gage elements to the external measuring and control instrument. The annular rings 58, 59, 60 contain an amount of mercury sufficient to make contact with the terminals of stationary contact elements 61, 62, 63, respectively. These terminals are shown as having a generally fish hook shape and can be used on either horizontal or vertical shafts wherein the mercury is impelled toward the circumference of the annular rings by centrifugal force or wherein the force of gravity maintains the mercury in contact with the stationary contact elements. However, the terminals are not necessarily limited to the shape shown and can be shaped in any form adapted to make contact with the mercury in the annular rings.

Strain gages 45 and 45' are shown connected in series circuit relation, and their leads are connected in a bridge circuit generally designated 100 through the medium of the mercury contactors 58, 59, and 60 on the shaft, so that each strain gage in series forms one leg of the bridge circuit. A battery 50 applies a D. C. voltage across junction points 51 and 52. However, if desired, a source of A. C. voltage may be used in place of battery 50. Resistances 56, 57 are variable resistances having the form of an adjustable slide wire. Resistance 56 is driven through a suitable mechanical linkage 80 by the servo motor in the control unit. The resistor and slide-wires are usually made of manganin in order to avoid any effect due to ambient temperature changes. Leads 62a and 70 complete the circuit through controller 71. The latter, through control line 72, operates valve 73 which, as subsequently explained, controls the force causing change of torsion on the shaft 40.

The control unit 71 may be any one of a number of commercially available units having either electrical or pneumatic valve operation. These control units are usually made up of an electrical servo system, generally of the continuous balance type, in which the direction and magnitude of the rotation of the servo motor is determined by the input signal to the unit. These units are equipped to convert the D. C. input signal to A. C., or to accept an A. C. input signal, and to amplify the input signal. The servo motor is linked by suitable mechanical means 80 to the slide-wire 57, to an indicating means such as a dial or pointer, and to the control element of that portion of the unit which controls the opening or closing of the valve in accordance with the deviation of the indicating means from a pre-selected value. This last unit may be either electrical or pneumatic. In the event that it is electrical it may consist of suitable electrical switching means, or of means to provide an electrical signal of variable magnitude proportional to the deviation of the indicating means from the pre-selected value, thereby controlling the position of the motor or solenoid operated valve. In the event that the unit is pneumatic the servo motor will usually control the position of a free vane which operates to vary the back pressure in the nozzle of the pneumatic system, thereby controlling the pressure of the air fed to the diaphragm of the air operated valve.

The strain gages 45, 45' are under initial tension and are located a fixed and predetermined distance from the center of the shaft, thus determining the linear displacement of the elements for a given angle of twist of the shaft. When the shaft is loaded sufficiently to impress a torque thereon it results in movement of one of the torque rings, 41 or 42, relative to the other. This increases the length and resistance of one of the strain gage elements 45 or 45' and correspondingly decreases the length and resistance of the other in proportion to the applied torque. This displacement produces a change in the resistance of the circuit; the corresponding change in the voltage drop across the resistance means constitutes an electrical signal proportional to the torque on the shaft. This signal is transmitted through the mercury in the annular rings 58, 59, 60 to the stationary contact points 61, 62, 63 connected to the Wheatstone bridge. The resulting unbalance of the bridge circuit causes a voltage to appear across the terminals of leads 62a and 70, the voltage being proportional to the torque on the shaft. More specifically, the change in the resistance of the strain gage elements is proportional to their distortion and the accompanying voltage change is therefore a function of the torsional stress on the shaft. Ambient temperature changes have little effect, since the strain gages are connected into the bridge circuit in such a manner that the thermal change of resistance of each element opposes the other.

The balancing operation continuously keeps pace with changes in the resistance, and hence in the voltage, of the measuring circuit in response to changes in the torque on the shaft. In operation, the voltage appearing across the terminals of leads 62a and 70 causes the electrical servo system to respond by a rotation of the servo motor, which, by changing the resistance of slide-wire 56, tends to restore the bridge circuit to balance and at the same time repositions the indicating and control means associated with it. Hence, there is no delay before corrective action is taken to relieve excessive torque or to restore normal torque. The Wheatstone bridge circuit may be standardized at a time when no torque is applied to the shaft by adjusting variable resistance 57 so that the indicating and/or control instrument indicates zero. The bridge circuit may also be standardized while a known torque is applied to the shaft by adjusting variable resistance 57 so that the indicating and/or controlling instrument indicates a value in accordance with the known torque or its equivalent in viscosity and/or density. If a control instrument is used, the control point is set in a manner appropriate to the particular instrument employed. In subsequent operation the torque on the shaft will, through the action of the Wheatstone bridge circuit, the electrical servo amplifier, the servo motor, and slide-wire 56 in accordance with the resistances of strain gage elements 45 and 45', cause the position of the servo motor, indicating means, and control means to be proportional to the torque applied to the shaft. Assume, for example, that when the torque on the shaft increases, the resistance of strain gage 45 increases, resistance 45' decreasing accordingly. The resulting momentary unbalance of the bridge circuit transmits a signal which actuates the servo motor in controller 71, causing it to rotate in such direction as to change the resistance of slide-wire 56, thus rebalancing the bridge; also it repositions the indicating and controlling means in accordance with the increased value of the torque. The servo motor is generally a brushless, reversible, two-phase variable speed induction motor, one winding of which is continuously energized by line voltage, the other winding being energized by the amplified alternating voltage. Its direction of rotation is determined by the phase of this amplified alternating voltage with respect to the phase of the line voltage; and the phase of the amplified alternating voltage is determined by the condition of unbalance of the Wheatstone bridge circuit. Hence, should the torque applied to the shaft be decreased instead of increased, the condition of unbalance of the Wheatstone bridge circuit will be opposite to that of the preceding example, and the direction of rotation of the servo motor opposite to that of the preceding example. Thus the bridge is essentially in continuous balance, and the position of the indicating and controlling means is continuously proportional to the torque applied to the shaft. Hence the electrical or pneumatic output signal of the controlling means may be utilized to maintain the torque applied to the shaft at a predetermined value.

Figure 4 illustrates the basic elements of controller 71 and its relation to the bridge and motor valve. For simplicity, strain gages 45, 45' are shown merely as adjacent resistances in bridge circuit 100, this being their actual relation to this circuit. The D. C. potential across leads 62a and 70 arising from an unbalance of the Wheatstone bridge circuit 100 is converted into an interrupted D. C., then into an alternating voltage by means of the converter and input transformer 81. The converter unit is polarized, so that the alternating voltage created is timed with the A. C. line voltage across leads 82, 83 so as to identify the polarity of the D. C. voltage. The converter is essentially a flat metal reed oscillating between two contacts connected to the opposite ends of the primary winding of the input transformer. This reed is connected to lead 62a; lead 70 is connected to the center tap of the input transformer. The alternating voltage and power from the secondary winding of the input transformer are amplified by means of voltage and power amplifier 84. The amplified voltage and power are used to energize two poles of a four-pole induction motor 85, referred to generally as a servo or balancing motor. The other two poles are energized by line voltage across 82', 83'. Consequently, the phase relationship of the alternating voltages determines the direction of rotation of the balancing motor 85, which through suitable mechanical linkages 80, 86, 90, actuates slidewire 56, indicating hand 87, and controller 91, thus restoring the bridge circuit to balance.

Actuation of the air-operated control unit 91 is obtained from the balancing motor 85 through a differential linkage 90. This linkage also includes the control index setting knob and gear assembly 88, 89. The linkage is so designed that a movement of the indicating hand 87 with respect to the control index 88 will rotate a flapper actuating arm, not shown. When the indicating hand and control index are superimposed, the flapper actuating arm remains in a fixed position, regardless of the setting of the control index. This arrangement permits the use of a stationary nozzle. The differential linkage also contains an adjustable lever system operated by a bellows, which acts to position the flapper with respect to the fixed nozzle. The changes in air pressure obtained by varying the position of the flapper with respect to the nozzle are amplified through a pilot valve.

When the indicating hand 87 is above the control setting, the measuring system, through the differential linkage 90 and adjustable lever system, will rotate the flapper actuating arm, thereby allowing the flapper to cover the nozzle. The resulting increase in nozzle pressure will be amplified through the pilot valve to build up the pressure on the diaphragm control valve 78, thereby closing the valve to some extent. This increase in air pressure is simultaneously transmitted to the bellows, the resultant movement of which causes the flapper to move away from the nozzle just enough to stabilize the pressure at the new value and maintain the control valve in its new position. This action produces a definite control valve position for each new position assumed by the indicating hand.

Additional refinements, such as reset and derivative action, may be incorporated in the control mechanism if desired.

Variable resistance 57 is included in the Wheatstone bridge circuit so that, by its adjustment, the indicating hand 87 may be caused to assume any desired position for a given torque applied to the shaft.

While mercury is preferred for transmitting the signal from the strain gage to the external circuit, any other conducting liquid may be used so long as it does not electrolyze to noxious or dangerous products. It is not necessary that the mercury be impelled toward the circumference of the annular rings to make contact with the stationary contact points, and the apparatus is not limited to such applications. Neither is the apparatus limited to use on horizontal shafts; it can also be used on vertical or inclined shafts. Connectors 58, 59, 60 are not necessarily restricted to the shape shown. For example, as shown in Figure 3, a narrow circular well 202 may also be provided in the annular sections 201 to hold the mercury; however, in this case the ends of the contact points 200 must then be lengthened to extend into the mercury. The annular sections are preferably made of some metal which does not amalgamate, for example, stainless steel. Since there is no contact of moving parts, there is no wear; hence, no appreciable inaccuracy is introduced into the transfer and measurement of the electrical impedances from the strain gages.

While the apparatus may be used for determining and/or controlling viscosity for given values of density, in a preferred embodiment this apparatus is best suitable for determining resistance to stirring or transportation and can be advantageously utilized to control density and viscosity within a certain optimum range dictated by the particular process. Often, a change in a process variable which produces a change in viscosity will also change density. The new combination of density and viscosity determines how difficult it is to stir or transport the liquid or slurry. In any process, it is often desirable to maintain a certain resistance to agitation or transportation regardless of whether the change in resistance is due to viscosity or density.

For example, in isomerization and alkylation of light hydrocarbons the aluminum chloride-hydrocarbon complex catalyst, after its separation from the reaction product, is recycled to the reactor. A portion is regenerated, as by solvent washing, prior to recycle. In use such catalysts gradually lose their activity and must be refortified by further additions of aluminum halide. The usual methods for refortifying these catalysts include the steps of pumping a portion of the catalyst from the reaction zone under considerable pressure, depressuring to approximately atmospheric pressure, adding aluminum halide, suspending or dissolving the added halide in the catalyst and pumping the catalyst back to the reaction zone. The return of catalyst to the reactor increases viscosity and also varies the density of the reaction mixture. The addition of too much regenerated catalyst causes difficulties in mixing. Furthermore, the relative amounts of recycle complex, regenerated complex, and fresh aluminum chloride determine the activity of the catalyst mixture. The rate of recycle catalyst can be made constant, whereupon the activity becomes determined by the ratio of the rates of fresh aluminum chloride to regenerated catalyst. Any given ratio will result in a certain resistance to stirring. Hence, this ratio can be advantageously and suitably controlled by the method of the present invention. For example, line 79 (Figure 2) can function as the supply line for fresh aluminum chloride, the flow of which would be controlled directly by the position of diaphragm valve 78. Then if the rate of addition of aluminum chloride became excessively high it would result in an excessive torque on the stirring mechanism, represented by shaft 40. The accompanying unbalance of the circuit would set in motion the control mechanism described above to partially close valve 78 and thereby throttle the flow through conduit 79. If, on the other hand, the flow through line 79 were too low it would result in unbalancing the circuit in the opposite direction; the control mechanism would then operate to further open valve 78 so as to increase the flow through conduit 79 sufficiently to restore the torque to the desired value.

Another preferred application of the present invention is to control the rate of crystallization in the p-xylene crystallizer. In this process the pure p-xylene is separated from a mixture of xylene isomers and ethyl benzene by crystallization on the cold walls of a cylindrical crystallizer. Cooling is effected by ethylene refrigerant evaporating in an annulus surrounding the cylindrical crystallizer. A scraper such as a helical screw slowly scrapes the walls of the crystallizer to remove large crystals therefrom. The resulting slurry is then further processed for separation of p-xylene from mother liquor. This process is described in greater detail in copending application Serial No. 431,119, same assignee. If the torque on shaft 40 exceeds the predetermined maximum it means that the consistency of the slurry augured from the crystallizer is too high as a result of excessive cooling and crystallization. The response of the control mechanism would then be to raise the pressure on the evaporating coolant, as by throttling the exhaust conduit 79 through suitable closure of valve 78. This would lower the evaporation rate, other factors being constant, to a point corresponding to the optimum torque, thus raising the crystallizer temperature and lowering the slurry consistency. Too low a torque value would unbalance the circuit the other way, resulting in lowering of the refrigerant vapor pressure by opening valve 78 sufficiently to restore the desired torque value.

The foregoing disclosure taken with the drawings are to be considered as illustrative of the principles of the invention and not to be construed in a limiting sense.

I claim:

1. In combination, a rotating shaft subject to torsional stress, a plurality of unbonded electrical strain gages mounted about the periphery of said shaft, the impedance of said strain gages varying in response to variations in the torsional stress on said shaft whereby said stress is converted to an electrical signal, a plurality of annular contactors mounted for rotation with said shaft, said contactors containing an electrically conductive liquid, means electrically connecting said liquid with said strain gages for transmission of said signal, control means responsive to said signal, and means operatively connecting said control means to the source of the torsional stress, whereby the torsional stress on said shaft is controlled in accordance with the electrical signal produced therefrom.

2. In combination, a rotating shaft subject to torsional stress; means for converting said stress into an electrical quantity, said means comprising a pair of wire strain gages attached to the shaft as part of an electrical circuit, whereby any change in the shaft torque causes a corresponding elongated change in said strain gages and a resulting change in their electrical resistance; a Wheatstone bridge external to the shaft; pick-up means connecting said strain gages into said bridge, said pick-up means comprising annular contactors mounted on the shaft and containing an electrically conductive liquid, leads connecting said strain gages to said liquid, stationary contact points adjacent the shaft and in fixed contact with the liquid in said contactors and leads connecting said contact points into said bridge, whereby a linear relation is established between the torsional stress on the shaft and the resulting bridge unbalance; a power source to energize said circuit; a control device responsive to the signal from said bridge; and means operatively connecting said control device to the source of the torque on said shaft, said control device operating through said means to so adjust the torque on the shaft as to maintain a desired value of the torque.

3. In combination, a vessel adapted to contain a liquid, the resistance to movement of which is to be determined, a rotatable shaft extending into the vessel and adapted to be immersed in the liquid contained therein, said shaft being subject to torsional strain according to the viscosity and density of the liquid; means for rotating said shaft; a plurality of unbonded electrical strain gages mounted about the periphery of said shaft, the impedance of the strain gages varying in response to variations in the torsional stress on said shaft; a stationary Wheatstone bridge positioned external to the shaft; a plurality of annular contactors mounted for rotation with said shaft; an electrically conductive liquid within said contactors; and means electrically connecting said liquid to said Wheatstone bridge, whereby impedance variations in the strain gages are transmitted through said contactors and liquid to said bridge.

4. In combination, a vessel adapted to contain a liquid, a shaft extending into said vessel and adapted for immersion in said liquid, said shaft being subjected to torsional stress according to the resistance of said liquid to movement; a Wheatstone bridge external to the shaft, a plurality of electrical strain gages mounted about said shaft for rotation therewith and forming part of said Wheatstone bridge circuit, said strain gages being subject to deformation in response to the torsional stresses on the shaft, the impedance and voltage drop of said circuit varying in response to strain-gage distortion; a plurality of annular rings encircling the shaft, said rings being adapted for rotation with the shaft but insulated from direct contact therewith, an annular well within the interior of said rings, said well containing an electrically conductive liquid, a circular slot in one surface of said rings opening into said wells and concentric with said rings, stationary contact points extending into said slots to contact said conducting liquid, leads electrically connecting said contact points to said Wheatstone bridge; and leads electrically connecting said conducting liquid with said strain gages to complete the circuit, whereby distortions in the strain gages in response to the torque on the shaft results in transmission of an electrical signal to said conducting liquid, contact points, and bridge circuit.

5. Apparatus for indicating the torque on a drive shaft comprising, in combination: a drive shaft, a set of torque members fixedly mounted on said shaft, said members comprising a pair of axially spaced halves of a split sleeve, whereby any twisting of the shaft results in movement of one torque member relative to the other; a pair of unbonded electrical strain gages mounted diametrically opposite each other on the torque members and spanning the space therebetween, whereby movement of one torque member relative to the other increases the length and electrical resistance of one strain gage and correspondingly decreases the length and electrical resistance of the other; a plurality of electrically conductive rings encircling the shaft and designed to rotate therewith but axially spaced from the torque members; insulating means separating said rings from said shaft and from each other; a circular slot extending into the interior of each ring and concentric with the axis thereof; an electrically conductive liquid contained within said slots; a set of stationary contact points extending into said slots; leads electrically connecting said strain gages with said rings, whereby changes in the impedance of the circuit caused by distortion of the strain gages are transmitted to the rings and the liquid therein; a Wheatstone bridge positioned externally of said shaft and so connected with said contact points that each of the strain gages constitutes one arm of the bridge, whereby a fluid electrical connection is provided between the rotating shaft and the stationary bridge; and control means responsive to bridge unbalance for adjusting the torque so as to maintain a desired value of the torque.

6. In an apparatus for determining the torque on a rotating shaft comprising a set of electrical strain gages so connected to said shaft as to rotate therewith, the resistance of the strain gages varying according to the torque on the shaft, and a torque control device external of the shaft to which the varying electrical impulses from the strain gages must be communicated, in combination: a set of annular contactors mounted on said shaft for rotation therewith, a well of mercury within each of said rings, means for electrically transmitting an impulse from the strain gages to said mercury wells; a Wheatstone bridge external to the shaft; and stationary pick-up means in contact with said mercury wells for relaying the impulse from the latter to said bridge.

7. Apparatus of claim 6 wherein said control device comprises, in combniation, a servo amplifier; a servo motor; means for driving the motor in response to the impulse received by said bridge, the direction and extent of rotation of said motor being determined by the direction and magnitude of unbalance of the bridge circuit; a conduit conveying a fluid which coacts with the rotating shaft to affect the torsion thereon; pneumatic throttling means in said conduit; and means for transmitting the effect of motion of said motor to said throttling means, by said pneumatic control, the position of the latter in said conduit being so adjusted that the resulting fluid flow in said conduit operates to maintain a desired torque value, and a direct mechanical linkage between said servo motor and a variable resistance in the Wheatstone bridge, whereby the rotation of the motor changes said variable resistance so as to rebalance the bridge circuit.

8. Apparatus responsive to a change of torque in which the response to the torque is to be transmitted from a rotatable shaft to a fixed torque control device external to the shaft, comprising in combination: at least one pair of electrical resistance strain gages supported by said shaft for rotation therewith, each member of the pair being positioned diametrically opposite the other member so that torsion of the shaft causes inverse distortion of the two members, a plurality of rings supported by said shaft for rotation therewith, a body of conductor liquid partially enclosed within said rings and electrically connected with said strain gages, means connecting the conductor liquid within said rings to said control device to complete a circuit, a source of current to energize said circuit, means to rotate the shaft, a chamber containing a fluid within which the shaft rotates, the resistance of the fluid to movement being dependent on its temperature, whereby when the shaft is rotated the resistance of the fluid results in distortion of the strain gages and a change in their impedance, the consequent change in voltage drop being communicated through the liquid in the rotating rings to the control means, and means responsive to said torque control device to modify the torsion on the shaft.

9. Apparatus of claim 8 wherein the means responsive to said control device comprises a conduit, a portion of which annularly surrounds the chamber in which the shaft operates and is adapted to convey a fluid in indirect heat exchange therewith, the resistance to movement of the fluid in the chamber varying with the temperature of the heat exchange fluid, a valve in said conduit, and means operatively connecting said control device to said valve, whereby the position of the valve in the conduit is adjustable to modify the action of the heat exchange fluid in the conduit so as to attain a predetermined torque on the shaft.

10. In an apparatus comprising a crystallization chamber, means for admitting a mixture of petro-chemical fractions to said chamber; an annulus surrounding said chamber, means for admitting and withdrawing a refrigerant from said annulus, a helical screw in said chamber for removal of crystallized product therefrom, the torsional stress on the screw varying directly with the density of the crystal slurry, a shaft exterior to the crystallizer and connected to said helical screw, and means for rotating said shaft, in combination: a set of electrical unbonded strain gages mounted circumferentially about the shaft but insulated from direct contact therewith; a set of axially spaced rings encircling another sesgment of the shaft, said rings being insulated from direct contact with the shaft but adapted to rotate therewith; means electrically connecting said rings to said strain gages; a body of electrically conducting liquid within said rings; a set of stationary contact points in contact with the liquid in said rings; a Wheatstone bridge, and leads connecting said contact points with said bridge, whereby variations in the impedance of the strain gages are transmitted by fluid connection from the rotating shaft through the stationary contact points to said bridge; and means responsive to the unbalance of said bridge for regulating the flow of refrigerant through said annulus.

11. In the apparatus of claim 10, means for insulating the strain gages from the shaft comprising the two halves of a divided non-conductive sleeve mounted on the shaft so as to be separated by a gap from each other, the strain gages being so mounted on said halves as to span said gap, whereby movement of one of said halves relative to the other changes the width of the gap and thereby changes the length and electrical resistance of each strain gage.

12. In combination, a rotating shaft subject to torsional stress, a plurality of unbonded electrical strain gages mounted about the periphery of said shaft, the impedance of said strain gages varying in response to variations in the torsional stress on said shaft whereby said stress is converted to an electrical signal, a stationary Wheatstone bridge positioned external to said shaft, a plurality of annular contactors mounted for rotation with said shaft, electrically conductive liquid within said contactors, and means electrically connecting said liquid to said Wheatstone bridge, whereby impedance variations in said strain gages are transmitted through said contactors and liquid to said Wheatstone bridge.

References Cited in the file of this patent

UNITED STATES PATENTS

| | | |
|---|---|---|
| 2,254,575 | Kronquest | Sept. 2, 1941 |
| 2,423,620 | Ruge | July 8, 1947 |
| 2,522,648 | Tachella | Sept. 19, 1950 |
| 2,527,825 | Kemp | Oct. 31, 1950 |
| 2,530,981 | Mikina | Nov. 21, 1950 |
| 2,672,487 | Tegge et al. | Mar. 16, 1954 |
| 2,682,170 | Hathaway | June 29, 1954 |
| 2,691,300 | Morris | Oct. 12, 1954 |

OTHER REFERENCES

Perry: Chemical Engineers Handbook, 3rd ed. (1950), page 1073, McGraw-Hill Book Co., N. Y., N. Y.